(12) United States Patent
Managi et al.

(10) Patent No.: US 11,230,270 B2
(45) Date of Patent: Jan. 25, 2022

(54) WIPER ARM

(71) Applicants: MITSUBA Corporation, Gunma (JP); Mazda Motor Corporation, Hiroshima (JP)

(72) Inventors: Nobukazu Managi, Gunma (JP); Keisuke Kondou, Hiroshima (JP); Ippei Yamauchi, Hiroshima (JP)

(73) Assignees: MITSUBA Corporation, Gunma (JP); MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/977,459

(22) PCT Filed: Feb. 20, 2019

(86) PCT No.: PCT/JP2019/006330
§ 371 (c)(1),
(2) Date: Sep. 1, 2020

(87) PCT Pub. No.: WO2019/167758
PCT Pub. Date: Sep. 6, 2019

(65) Prior Publication Data
US 2021/0078543 A1   Mar. 18, 2021

(30) Foreign Application Priority Data

Mar. 2, 2018  (JP) .............................. JP2018-037537

(51) Int. Cl.
*B60S 1/52*          (2006.01)
(52) U.S. Cl.
CPC ..................................... *B60S 1/522* (2013.01)

(58) Field of Classification Search
CPC ....................................................... B60S 1/522
See application file for complete search history.

(56) References Cited

U.S. PATENT DOCUMENTS 5,283,926 A    2/1994  Hoshino

FOREIGN PATENT DOCUMENTS

| FR | 3035631 | 11/2016 |
| JP | S56168451 | 12/1981 |
| JP | H05502417 | 4/1993 |

(Continued)

OTHER PUBLICATIONS

"International Search Report (Form PCT/ISA/210) of PCT/JP2019/006330," dated Apr. 2, 2019, with English translation thereof, pp. 1-4.

(Continued)

*Primary Examiner* — Andrew A Horton
(74) *Attorney, Agent, or Firm* — JCIPRNET (57) ABSTRACT

Provided is a windshield wiper arm. This windshield wiper arm includes: an arm head (10); a shank; an arm piece connected to the windshield wiper blade; a washer nozzle which sprays a washer liquid onto the wiping surface; and a hose. The hose is divided into a first hose disposed along the arm head and a second hose disposed within the vehicle body. The first hose and the second hose are connected in a manner that washer liquid can flow from one hose to the other via a joint member (70). The arm head (10) has an opening part (10A) which opens on a fastening part 11 side, and the joint member (70) is mounted to the arm head (10) in a manner that the part of the joint member (70) that connects with the second hose penetrates the opening part (10A).

5 Claims, 10 Drawing Sheets

(56) References Cited

FOREIGN PATENT DOCUMENTS

| | | |
|---|---|---|
| JP | H0558529 | 8/1993 |
| JP | 2016203712 | 12/2016 |
| WO | 2016167090 | 10/2016 |

OTHER PUBLICATIONS

"Written Opinion of the International Searching Authority (Form PCT/ISA/237) of PCT/JP2019/006330," dated Apr. 2, 2019, with English translation thereof, pp. 1-7.
"Search Report of Europe Counterpart Application", dated Oct. 20, 2021, pp. 1-7.

WIPER ARM

CROSS-REFERENCE TO RELATED APPLICATION

This application is a 371 application of the international PCT application serial no. PCT/JP2019/006330, filed on Feb. 20, 2019, which claims the priority benefit of Japan application no. 2018-037537, filed on Mar. 2, 2018. The entirety of each of the above-mentioned patent applications is hereby incorporated by reference herein and made a part of this specification.

BACKGROUND

Technical Field

The present invention relates to a wiper arm.

Related Art

Conventionally, a wiper arm as shown in patent literature 1 below is known. The wiper arm includes an arm head rotatable around a pivot shaft disposed on a vehicle body, an arm piece to which a wiper blade that wipes a wiping surface is connected, and a washer nozzle for spraying a washer liquid onto the wiping surface. Further, a nozzle side hose for supplying the washer liquid is connected to the washer nozzle.

Then, the nozzle side hose is connected to one end of a vehicle body side hose by a joint member fixed inside the arm head. A vehicle body side hose is dragged around the pivot shaft. The other end of the vehicle body side hose is connected to a washer tank disposed inside the vehicle body. Thus, the washer liquid from the washer tank is supplied to the washer nozzle.

LITERATURE OF RELATED ART

Patent Literature

Patent literature 1: Japanese Patent Laid-Open No. 2016-203712

SUMMARY

Problems to be Solved

As described above, in the conventional wiper arm, the vehicle body side hose is dragged around the pivot shaft. Therefore, the length of the vehicle body side hose dragged around the pivot shaft changes with the rotation of the arm head, so that the vehicle body side hose is stretched and the vehicle body side hose tends to slack.

The present invention has been made in view of the above mentioned circumstances, and an objective of the present invention is to provide a wiper arm with which it is possible to effectively curb slack in a hose.

Means to Solve the Problems

In order to solve the above problems, the wiper arm of the present invention includes: a fastening part having a fastening hole into which a pivot shaft arranged in a vehicle body is inserted; an arm head having the fastening part; a shank connected to the arm head; an arm piece in which a base end part is fixed to the shank and a front end part is connected to a wiper blade wiping a wiping surface; a washer nozzle which is mounted on the arm piece and sprays a washer liquid onto the wiping surface; and a hose which is connected to the washer nozzle and supplies the washer liquid to the washer nozzle. The hose is divided into a first hose disposed along the arm head and a second hose disposed in the vehicle body. The first hose and the second hose are connected in a manner that the washer liquid flows to each other through a joint member in which a flow path is formed. The arm head has an opening part which opens on a fastening part side. The joint member is mounted on the arm head in a manner that a connection part of the joint member with the second hose penetrates the opening part.

As described above, according to the above configuration, the hose is divided into the first hose and the second hose, and the first hose and the second hose are connected by the joint member. Besides, the opening part which opens on the fastening part side is arranged in the arm head, and the joint member is mounted in the manner that the connection part of the joint member with the second hose penetrates the opening part. Therefore, the hose can be disposed overlapping the pivot shaft in the height direction along a normal line of the wiping surface. Thus, it is difficult for the second hose to interfere with the pivot shaft when the arm head rotates. Therefore, the length at which the hose is dragged is not prone to change, it is possible to prevent the hose from being stretched or entangled in the fastening part, and it is possible to effectively curb slack in the hose.

In addition, the shank may be rotatable around a connection portion with the arm head in a direction away from the wiping surface, and a hose housing part for housing the first hose may be formed in the arm head, and the hose housing part may have a holding part that holds the first hose by clamping the first hose from both sides in a wiping direction of the wiper blade.

In this case, the first hose is held by being clamped in the holding part of the hose housing part in the wiping direction. Therefore, when the shank is rotated (rock back) toward a direction away from the wiping surface with respect to the arm head, it is possible to curb slack in the first hose more effectively.

In addition, the arm head may be provided with a joint member housing part which is formed in a manner of penetrating the arm head and is capable of housing the joint member. An engaging part that engages with the joint member housing part may be formed on a side surface of the joint member directed to the wiping direction of the wiper blade.

In this case, because the engaging parts are formed in the joint member, the movement of the joint member toward a direction along the longitudinal direction of the arm head can be restricted.

In addition, a top wall part arranged on a side opposite to the wiping surface with respect to the joint member, and a support wall part facing the top wall part may be formed in the joint member housing part. The top wall part and the support wall part may form a part of an inner wall of the joint member housing part. The joint member may be held in a manner of being sandwiched between the top wall part and the support wall part.

In this case, because the joint member is held in the manner of being sandwiched between the top wall part and the support wall part which are formed in the joint member housing part, it is possible to prevent the joint member from being displaced in the height direction along the normal line of the wiping surface with respect to the joint member housing part.

In addition, because the joint member can be fixed by using the joint member housing part, it is not necessary to arrange another engaging part in the arm head, and the manufacturing cost can be reduced.

Effect

According to the present invention, it is possible to effectively curb slack in a hose.

DESCRIPTION OF THE EMBODIMENTS

Next, a wiper arm 1 according to an embodiment of the present invention is described with reference to FIG. 1 to FIG. 10.

Figure 1:
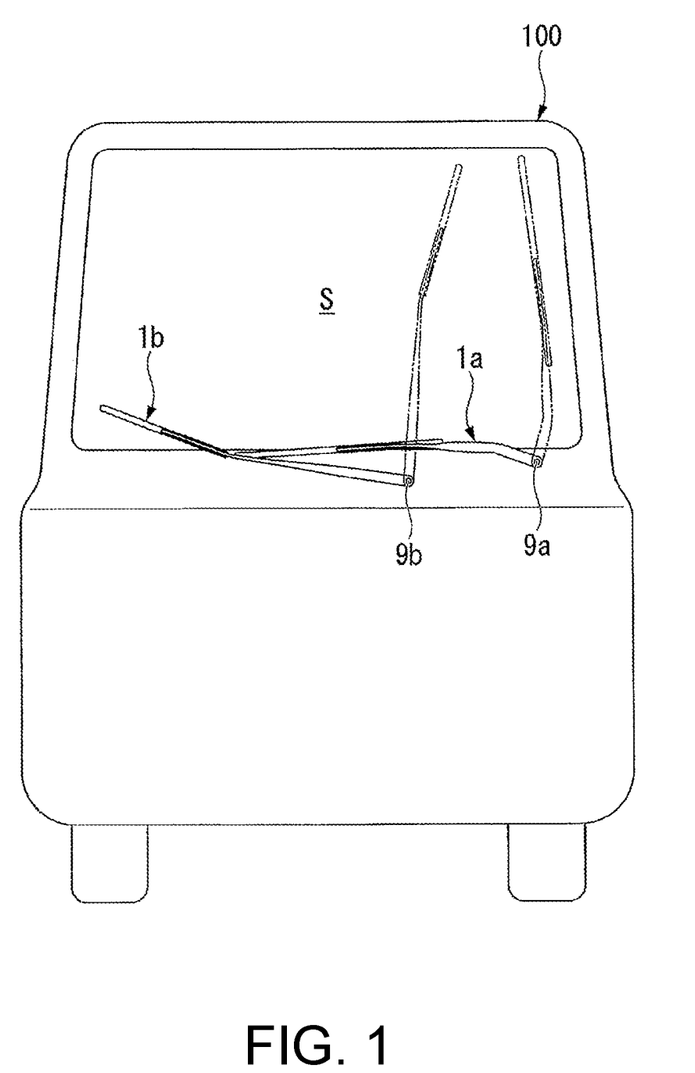
FIG. 1 is a front view of a vehicle equipped with wiper arms according to an embodiment of the present invention.

As shown in FIG. 1, a vehicle body 100 is provided with pivot shafts 9a, 9b at two locations of a driver seat side (hereinafter, referred to as DR side) and an assistant seat side (hereinafter, referred to as AS side). A DR side wiper arm 1a and an AS side wiper arm 1b are mounted on the pivot shafts 9a, 9b respectively.

Figure 2:
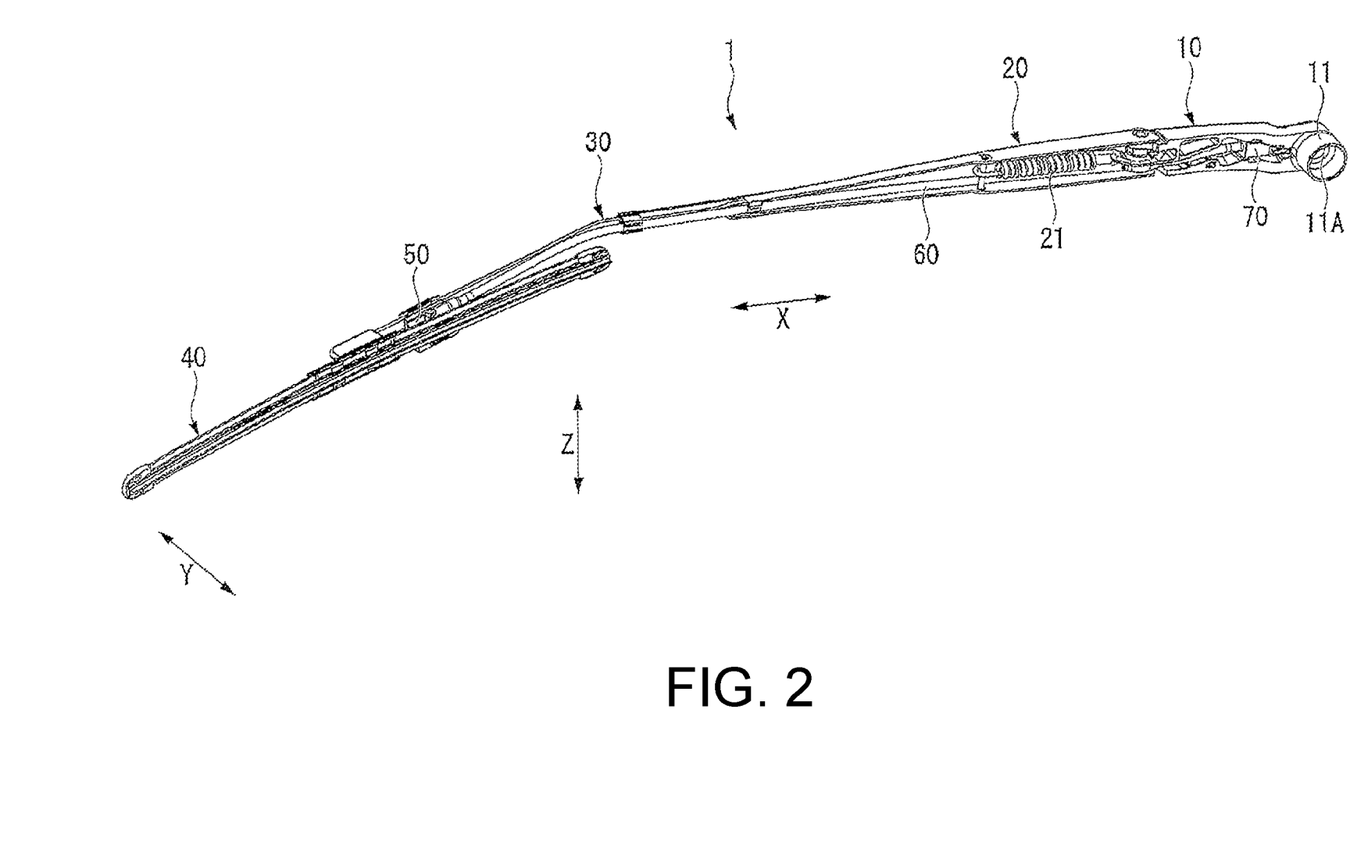
FIG. 2 is a perspective view of the wiper arm shown in FIG. 1.
Figure 3:
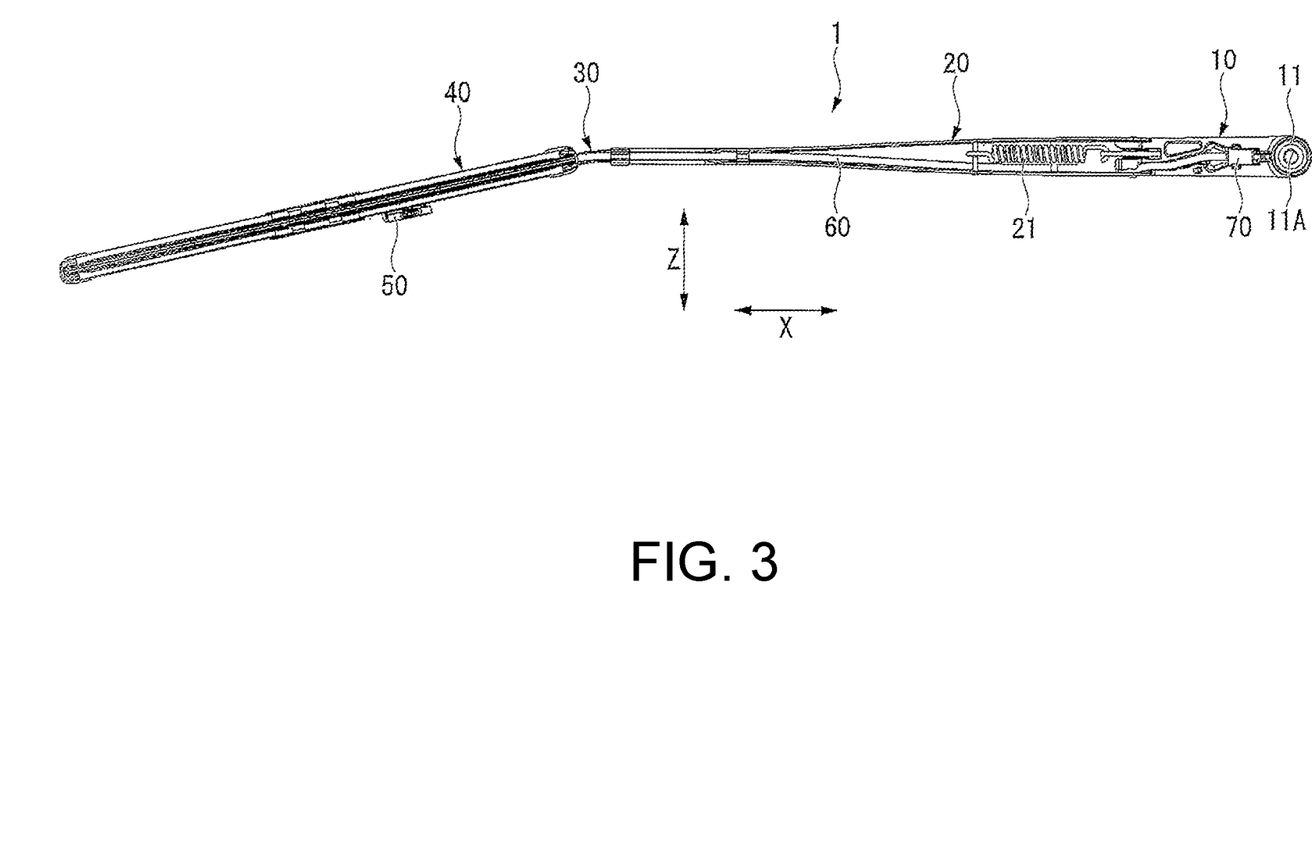
FIG. 3 is a back view of the wiper arm shown in FIG. 1.
Figure 4:
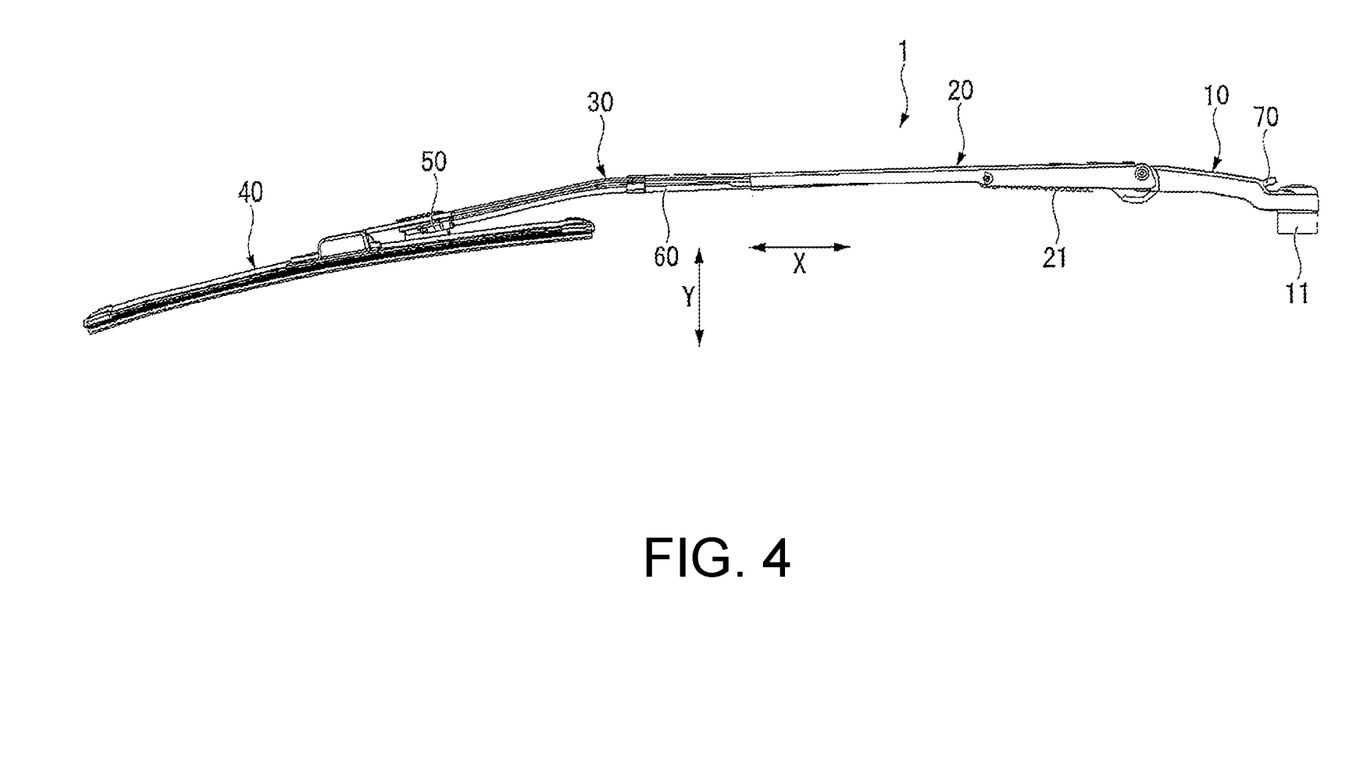
FIG. 4 is a plan view of the wiper arm shown in FIG. 1.
Figure 5:
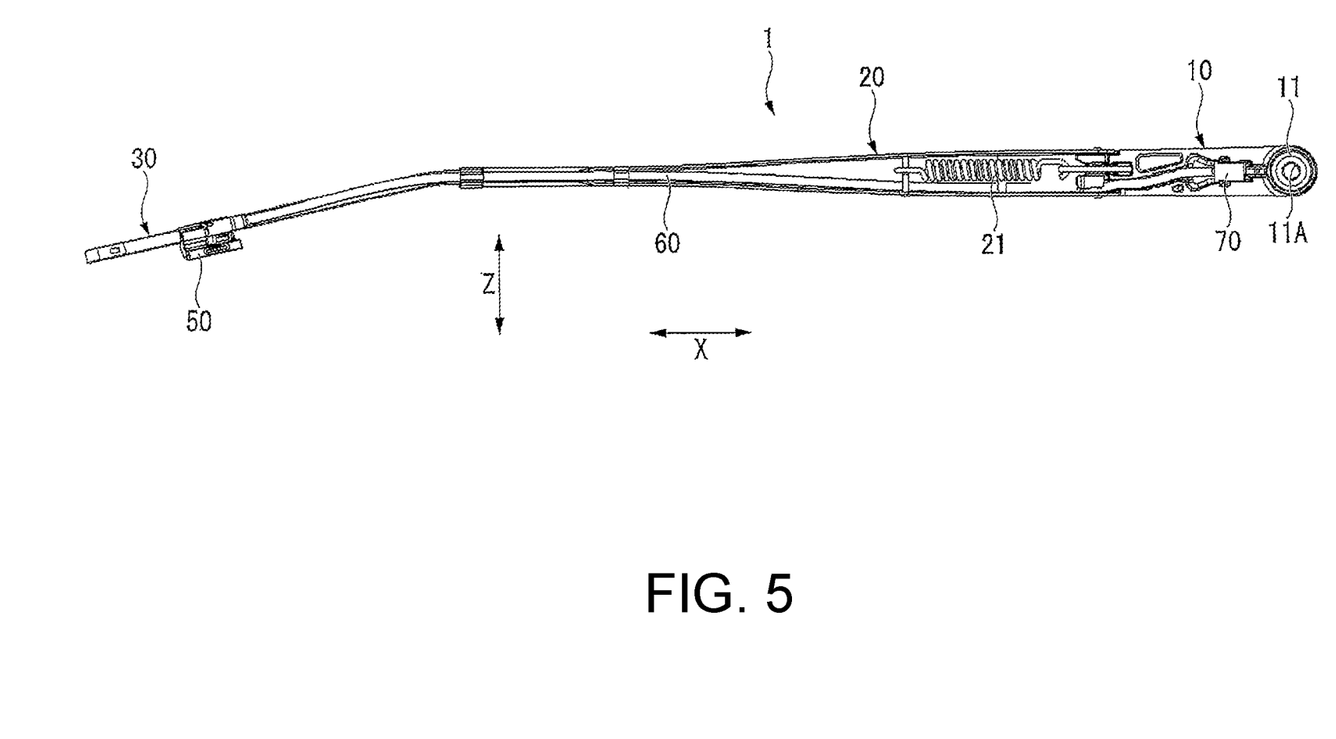
FIG. 5 is a diagram showing a state in which a blade rubber is removed from the wiper arm shown in FIG. 3.

FIG. 2 shows the AS side wiper arm 1b, and because the DR side wiper arm 1a and the AS side wiper arm 1b have the same configuration, only the AS side wiper arm 1b is described below. Further, in the description of the AS side wiper arm 1b, configuration parts of the AS side wiper arm are simply referred to as "wiper am 1" and the like without adding "AS side", and symbol suffixes "a, b" distinguished by the DR side and the AS side are omitted.

As shown in FIG. 1 to FIG. 5, the wiper arm 1 according to the present embodiment includes an arm head 10 rotatable around pivot shafts 9a, 9b provided on a vehicle body 100, and a shank 20 connected to the arm head 10. The arm head 10 and the shank 20 are formed into an elongated shape extending in one direction. In the following description, the one direction is referred to as longitudinal direction X.

The arm head 10 has a fastening part 11 having a fastening hole 11A into which the pivot shaft 9 is inserted. The fastening part 11 is arranged at one end of the arm head 10 in the longitudinal direction X. One end of the shank 20 in the longitudinal direction X is connected to the other end of the arm head 10 in the longitudinal direction X.

At the other end of the shank 20 in the longitudinal direction X, an arm piece 30 is fixed. The arm piece 30 is formed into an elongated shape extending in the longitudinal direction X. One end of the arm piece 30 in the longitudinal direction X (base end part) is fixed to the shank 20.

In examples of drawings, the arm piece 30 is fixed to the shank 20 by caulking the other end of the shank 20 in the longitudinal direction X.

A wiper blade 40 which wipes a wiping surface S (refer to FIG. 1) is connected to the other end of the arm piece 30 in the longitudinal direction X (front end part). The wiper blade 40 is formed into an elongated shape extending in the longitudinal direction X.

The wiping surface S is, for example, a windshield arranged in the front of a vehicle. By the rotation of the arm head 10 around the pivot shaft 9, the wiper blade 40 wipes the wiping surface S.

In the following description, a direction along a normal line of the wiping surface S is referred to as a vertical direction Y, and in the vertical direction Y, the wiper arm 1 side viewed from the wiping surface S is set as the upper side. Further, a direction orthogonal to the vertical direction Y and the longitudinal direction X is referred to as a wiping direction Z of the wiper blade 40.

A washer nozzle 50 that sprays a washer liquid onto the wiping surface S is mounted on the base end side of a connection portion of the arm piece 30 with the wiper blade 40. A hose 60 that supplies the washer liquid to the washer nozzle 50 is connected to the washer nozzle 50, and the hose 60 is disposed along the arm piece 30.

Figure 6:
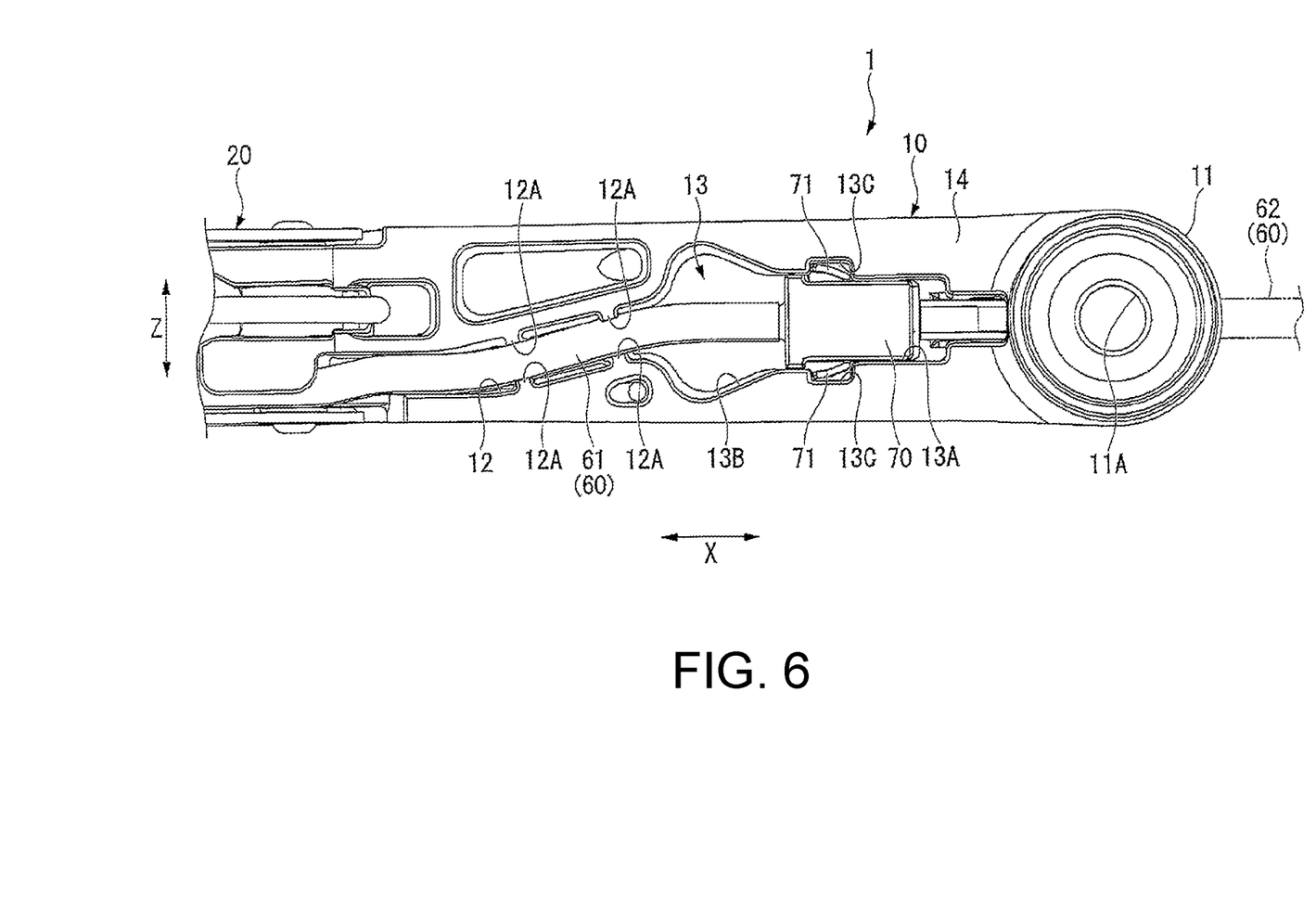
FIG. 6 is an enlarged view of the peripheral surface of an arm head in the wiper arm shown in FIG. 3.
Figure 7:
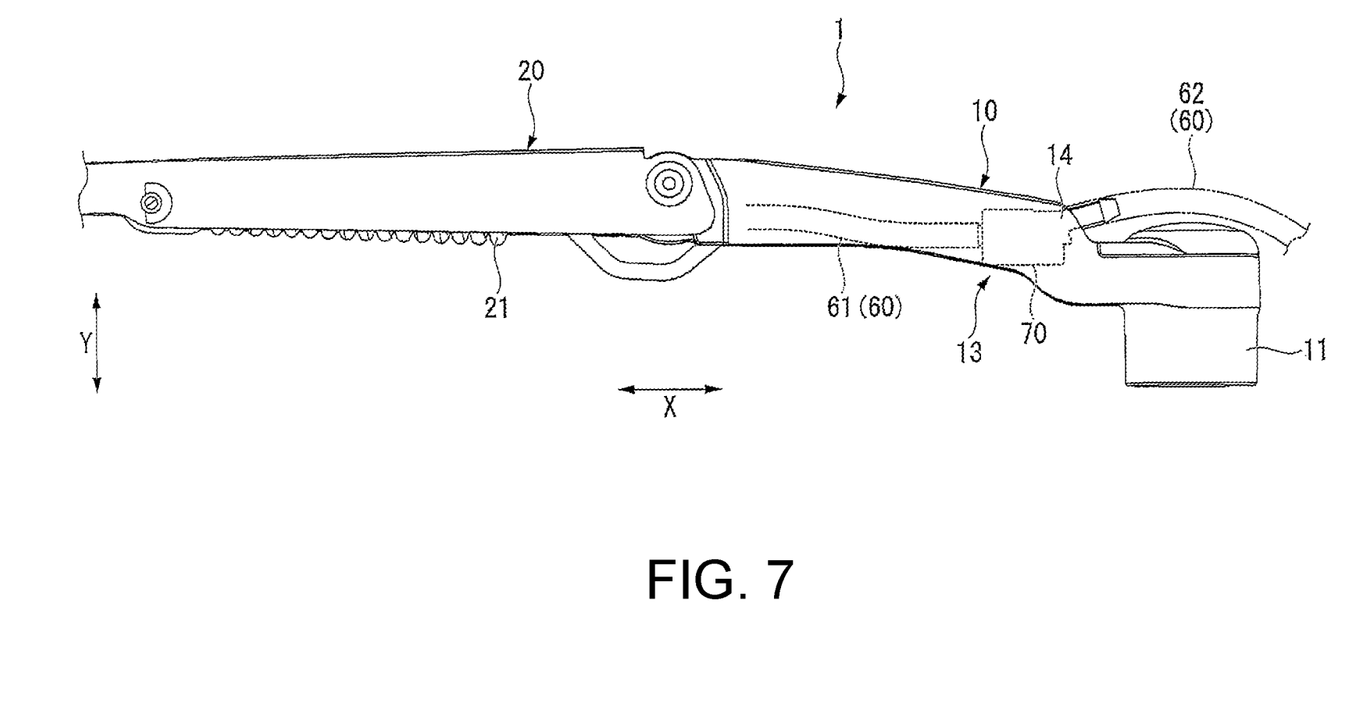
FIG. 7 is an enlarged view of the peripheral surface of the arm head in the wiper arm shown in FIG. 4.

As shown in FIG. 6 and FIG. 7, the hose 60 is divided into a first hose 61 disposed along the arm head 10 and a second hose 62 disposed inside the vehicle body 100. The first hose 61 is connected to the washer nozzle 50, and the second hose 62 is connected to a washer tank (not shown) in the vehicle body 100. The washer tank is filled with the washer liquid.

Then, the first hose 61 and the second hose 62 are connected in a manner that the washer liquid can flow from a hose to the other through a joint member 70 in which a flow path is formed. The joint member 70 is made of, for example, a synthetic resin material.

The joint member 70 is mounted on the arm head 10 side by side with the fastening part 11 in a manner of penetrating the arm head 10. More specifically, the arm head 10 has an opening part 10A (refer to FIG. 8 and FIG. 11) that opens on the fastening part 11 side, and the joint member 70 is mounted on the arm head 10 in a manner that a connection part of the joint member 70 with the second hose 62 penetrates the opening part 10A.

In addition, the shank 20 is rotatable (rock back) around the connection portion with the arm head 10 toward a direction away from the wiping surface S. The shank 20 and the arm head 10 are connected to each other by a coil spring 21.

As shown in FIG. 6, a hose housing part 12 which houses the first hose 61 is formed in the arm head 10. The hose housing part 12 is formed into a groove shape that is recessed toward the upper side and extends along the longitudinal direction X on the inner surface of the arm head 10.

On the inner surface of the hose housing part 12, engagement protrusions 12A that protrude toward the inside of the hose housing part 12 in the wiping direction Z are formed. A plurality of engagement protrusions 12A are formed at intervals in the longitudinal direction X.

In the examples of the drawings, on the inner surface of the hose housing part 12, the engagement protrusions 12A are formed at two locations spaced apart from each other in the longitudinal direction X. The first hose 61 is held in the hose housing part 12 by being sandwiched between the engagement protrusions 12A from both sides in the wiping direction Z.

As shown in FIG. 7, the arm head 10 is provided with a joint member housing part 13 which is formed in a manner of penetrating the arm head 10 and is capable of housing the joint member 70.

A step part 14 whose position in the vertical direction Y changes is formed in a part of the arm head 10 which is continuous with the fastening part 11 in the longitudinal direction X. The joint member housing part 13 is formed in a manner of penetrating the step part 14 in the longitudinal direction.

In addition, as shown in FIG. 6, the joint member housing part 13 is formed to be larger than the hose housing part 12 in the wiping direction Z.

The joint member housing part 13 includes a mounting part 13A which is located on one side in the longitudinal direction X and houses the joint member 70, and a temporary mounting part 13B which is located on the other side in the longitudinal direction X and temporarily mounts the joint member 70.

The temporary mounting part 13B is formed to be larger than the mounting part 13A in the wiping direction Z. The size of the temporary mounting part 13B in the wiping direction Z gradually increases from the end of one side of the longitudinal direction X toward the other side.

A pair of engaged parts 13C that are recessed outward in the wiping direction Z are formed in a part of the mounting part 13A which is continuous with the temporary mounting part 13B in the longitudinal direction X.

Figure 8:
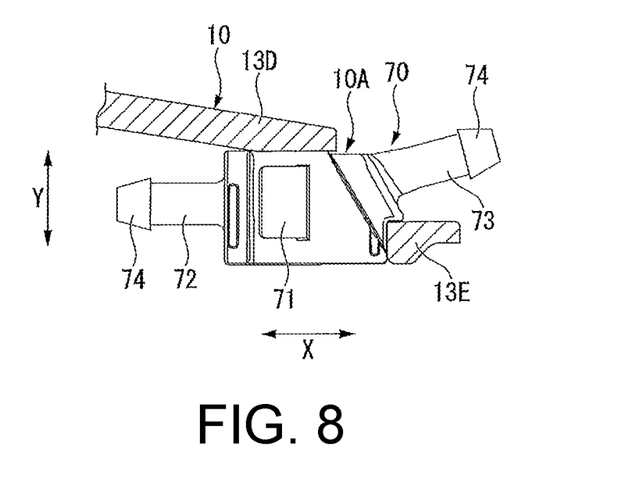
FIG. 8 is a diagram showing a mounted state of a joint member shown in FIG. 7.

In addition, as shown in FIG. 8, in the joint member housing part 13, a top wall part 13D arranged on a side opposite to the wiping surface S with respect to the joint member, and a support wall part 13E facing the top wall part 13D are formed.

Figure 11:
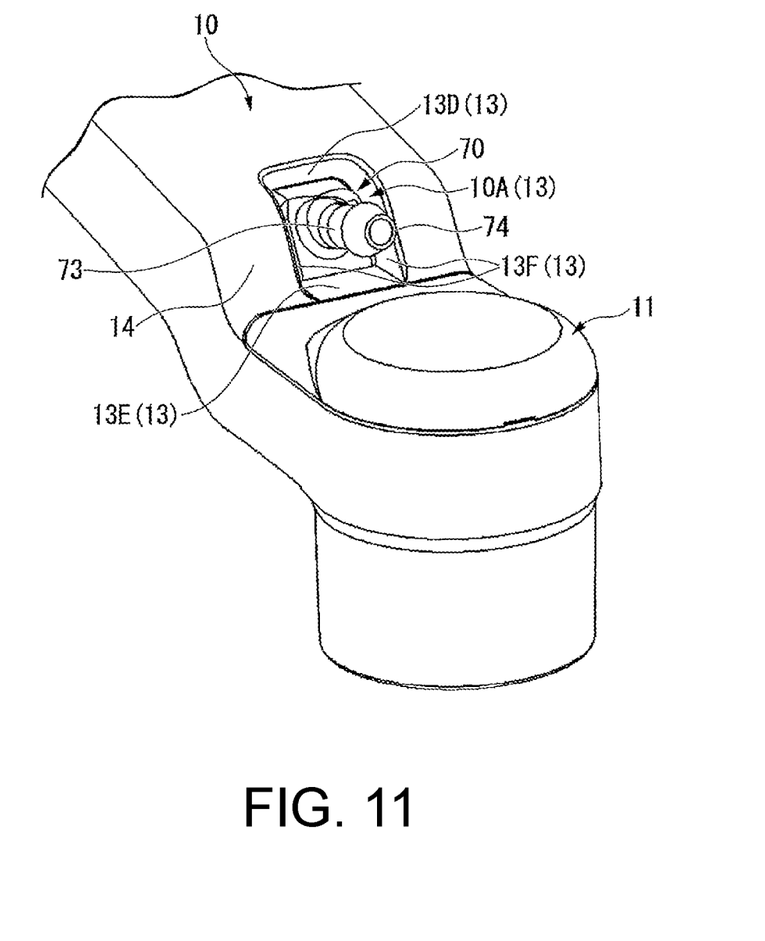
FIG. 11 is an enlarged perspective view showing the periphery of a fastening part shown in FIG. 10.

The joint member 70 is held in a manner of being sandwiched between the top wall part 13D and the support wall part 13E. As shown in FIG. 11, inner walls of the joint member housing part 13 is formed by the top wall part 13D, the support wall part 13E, and a pair of side wall parts 13F.

Figure 9:
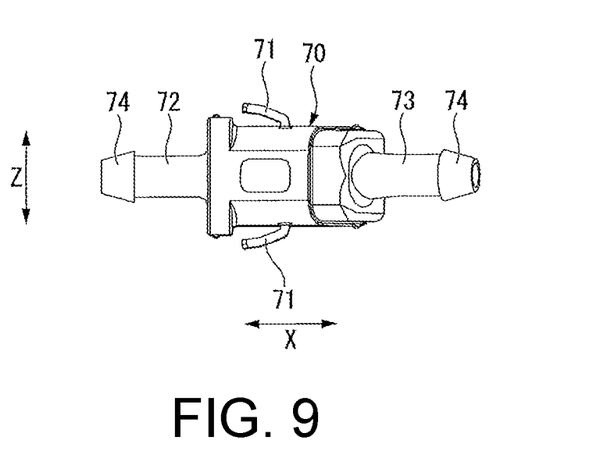
FIG. 9 is a back view of the joint member shown in FIG. 7.

As shown in FIG. 6 and FIG. 9, engaging parts 71 that engage with the engaged parts 13C of the joint member housing part 13 are formed on the side surface of the joint member 70 directed to the wiping direction Z. In the examples of the drawings, a pair of snap fits is formed as the engaging parts 71.

The engaging parts 71 gradually extends outward in the wiping direction Z from one side of the longitudinal direction X toward the other side on the side surface of the joint member 70.

As shown in FIG. 8 and FIG. 9, the joint member 70 is formed into a rectangular parallelepiped shape extending in the longitudinal direction X. Among outer surfaces of the joint member 70, two end surfaces directed to both outer sides of the longitudinal direction X are provided with hose connection parts 72, 73 respectively.

The hose connection parts 72, 73 are constituted by the first hose connection part 72 arranged on a surface directed to the other side of the longitudinal direction X and the second hose connection part 73 arranged on a surface directed to one side of the longitudinal direction X, the surfaces being the outer surfaces of the joint member 70. The first hose 61 is connected to the first hose connection part 72, and the second hose 62 is connected to the second hose connection part 73.

Each of the first hose connection part 72 and the second hose connection part 73 is formed into a hollow shaft shape protruding outward in the longitudinal direction X with respect to the joint member 70. The first hose connection part 72 is press-fitted inside the first hose 61 and the second hose connection part 73 is press-fitted inside the second hose 62.

Fall-out prevention parts 74 are formed separately on the front end part of the first hose connection part 72 and the front end part of the second hose connection part 73, the fall-out prevention parts 74 protruding outward in the radial direction with respect to central axes of the first hose connection part 72 and the second hose connection part 73, and curbing the fall-out of the hoses 60 connected to the connection parts.

The first hose connection part 72 extends substantially parallel to a central axis of the joint member 70 in the longitudinal direction X. The second hose connection part 73 is inclined with respect to the central axis. That is, the second hose connection part 73 gradually extends upwardly toward one side of the longitudinal direction X.

Therefore, as shown in FIG. 7, the second hose 62 which is connected to the second hose connection part 73 is connected to the inside of the vehicle body 100 through the upper side of the fastening part 11.

Next, the procedure for housing the joint member 70 into the joint member housing part 13 is described with reference to FIG. 6.

First, the joint member 70 is housed in the temporary mounting part 13B of the joint member housing part 13. At this time, because the temporary mounting part 13B is formed larger than the mounting part 13A in the wiping direction Z, the engaging part 71 of the joint member 70 can be prevented from interfering with the side wall part of the joint member housing part 13 directed to the wiping direction Z.

Then, the joint member 70 is slid toward one side of the longitudinal direction X housed in the mounting part 13A. At this time, the engaging part 71 of the joint member 70 is elastically deformed inward in the wiping direction Z and is housed in the engaged part 13C of the mounting part 13A.

Then, the engaging part 71 engages with the engaged part 13C in the longitudinal direction X by being restored and deformed outward in the wiping direction Z in the engaged part 13C. Further, as shown in FIG. 8, the joint member 70 is held in a manner of being sandwiched by the top wall part 13D and the support wall part 13E in the vertical direction Y.

Finally, the first hose 61 is connected to the first hose connection part 72 of the joint member 70, and the second hose 62 is connected to the second hose connection part 73 of the joint member 70.

Figure 10:
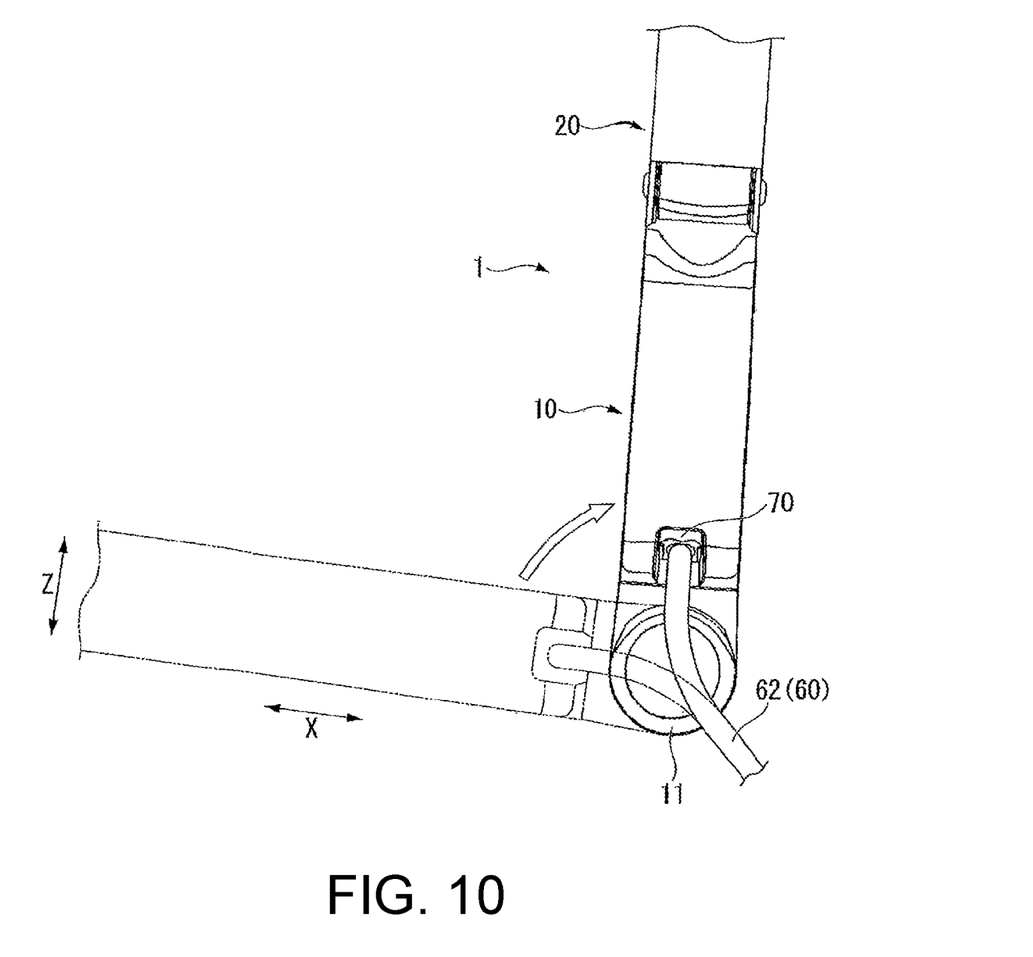
FIG. 10 is a front view showing a state in which a second hose is connected to the wiper arm shown in FIG. 7.

Next, the behavior of the second hose 62 when the arm head 10 is rotated around the pivot shaft 9 is described.

As shown in FIG. 10, when the arm head 10 is rotated, the second hose 62 is deformed in the rotating direction of the arm head 10 above the fastening part 11, centering on the part connected to the inside of the vehicle body 100. At this time, the second hose 62 is overlapped with the rotation center of the arm head 10 in the vertical direction Y and deforms, thus the second hose 62 does not get caught on the pivot shaft 9, so that the change in the length of the second hose 62 can be suppressed before and after the rotation of the arm head 10.

As described above, the hose 60 is divided into the first hose 61 and the second hose 62, which are connected by the joint member 70. Then, the arm head 10 is provided with the opening part 10A which opens on the fastening part 11 side, and the joint member 70 is mounted in the manner that the connection part of the joint member 70 with the second hose 62 penetrates the opening part 10A.

Therefore, the hose 60 can be disposed overlapping the pivot shaft 9 in the height direction along the normal line of the wiping surface S. Thus, it is difficult for the second hose 62 to interfere with the pivot shaft 9 when the arm head 10 rotates.

Therefore, the length at which the hose 60 is dragged is not prone to change, it is possible to prevent the hose 60 from being stretched or entangled in the fastening part 11, and it is possible to effectively curb slack in the hose 60.

In addition, the first hose 61 is held by being clamped in a holding part of the hose housing part 12 in the wiping direction Z. Therefore, when the shank 20 is rotated (rock back) toward the direction away from the wiping surface S with respect to the arm head 10, it is possible to curb the slack in the first hose 61 more effectively.

Further, because the engaging parts 71 are formed in the joint member 70, the movement of the joint member 70 toward a direction along the longitudinal direction X of the arm head 10 can be restricted.

In addition, because the joint member 70 is held in the manner of being sandwiched between the top wall part 13D and the support wall part 13E which are formed in the joint member housing part 13, it is possible to prevent the joint member 70 from being displaced in the height direction along the normal line of the wiping surface S with respect to the joint member housing part 13.

In addition, because the joint member 70 can be fixed by using the joint member housing part 13, it is not necessary to arrange another engaging part in the arm head 10, and the manufacturing cost can be reduced.

Furthermore, the technical scope of the present invention is not limited to the embodiment described above, and various modifications may be made without deviating from the spirit of the present invention.

For example, although the hose 60 is sandwiched and held in the hose housing part 12 from both sides in the wiping direction Z in the above embodiment, the present invention is not limited thereto. The hose 60 may be housed without being sandwiched in the hose housing part 12.

In addition, although the engaging part 71 which engages with the engaged part 13C formed in the joint member housing part 13 is formed in the joint member 70 in the above embodiment, the present invention is not limited thereto. The engaging part 71 may not be formed on the joint member 70.

In addition, although the top wall part 13D and the support wall part 13E are formed in the joint member housing part 13 and the joint member 70 is held by the top wall part 13D and the support wall part 13E in the above embodiment, the present invention is not limited thereto. The top wall part 13D and the support wall part 13E may not be formed in the joint member housing part 13.

Furthermore, it is possible to appropriately replace constituent elements in the above embodiment with known constituent elements without deviating from the spirit of the present invention, and it is also possible to appropriately combine the modification examples described above.

What is claimed is:

1. A wiper arm, comprising:
   a fastening part having a fastening hole into which a pivot shaft arranged in a vehicle body is inserted;
   an arm head having the fastening part;
   a shank connected to the arm head;
   an arm piece in which a base end part is fixed to the shank and a front end part is connected to a wiper blade wiping a wiping surface;
   a washer nozzle which is mounted on the arm piece and sprays a washer liquid onto the wiping surface; and
   a hose which is connected to the washer nozzle and supplies the washer liquid to the washer nozzle;
   wherein the hose is divided into a first hose disposed along the arm head and a second hose disposed within the vehicle body,
   the first hose and the second hose are connected in a manner that the washer liquid flows to each other through a joint member in which a flow path is formed;
   the arm head has an opening part which opens on a fastening part side; and
   the joint member is mounted on the arm head in a manner that a connection part of the joint member with the second hose penetrates the opening part.

2. The wiper arm according to claim 1, wherein the shank is rotatable around a connection portion with the arm head in a direction away from the wiping surface,
   a hose housing part for housing the first hose is formed in the arm head, and
   the hose housing part has a holding part that holds the first hose by clamping the first hose from both sides in a wiping direction of the wiper blade.

3. The wiper arm according to claim 2, wherein the arm head is provided with a joint member housing part which is formed in a manner of penetrating the arm head and is capable of housing the joint member; and
   an engaging part that engages with the joint member housing part is formed on a side surface of the joint member directed to the wiping direction of the wiper blade.

4. The wiper arm according to claim 1, wherein the arm head is provided with a joint member housing part which is formed in a manner of penetrating the arm head and is capable of housing the joint member; and
   an engaging part that engages with the joint member housing part is formed on a side surface of the joint member directed to the wiping direction of the wiper blade.

5. The wiper arm according to claim 4, wherein a top wall part arranged on a side opposite to the wiping surface with respect to the joint member, and a support wall part facing the top wall part are formed in the joint member housing part;
   the top wall part and the support wall part form a part of an inner wall of the joint member housing part; and
   the joint member is held in a manner of being sandwiched between the top wall part and the support wall part.

* * * * *